UNITED STATES PATENT OFFICE.

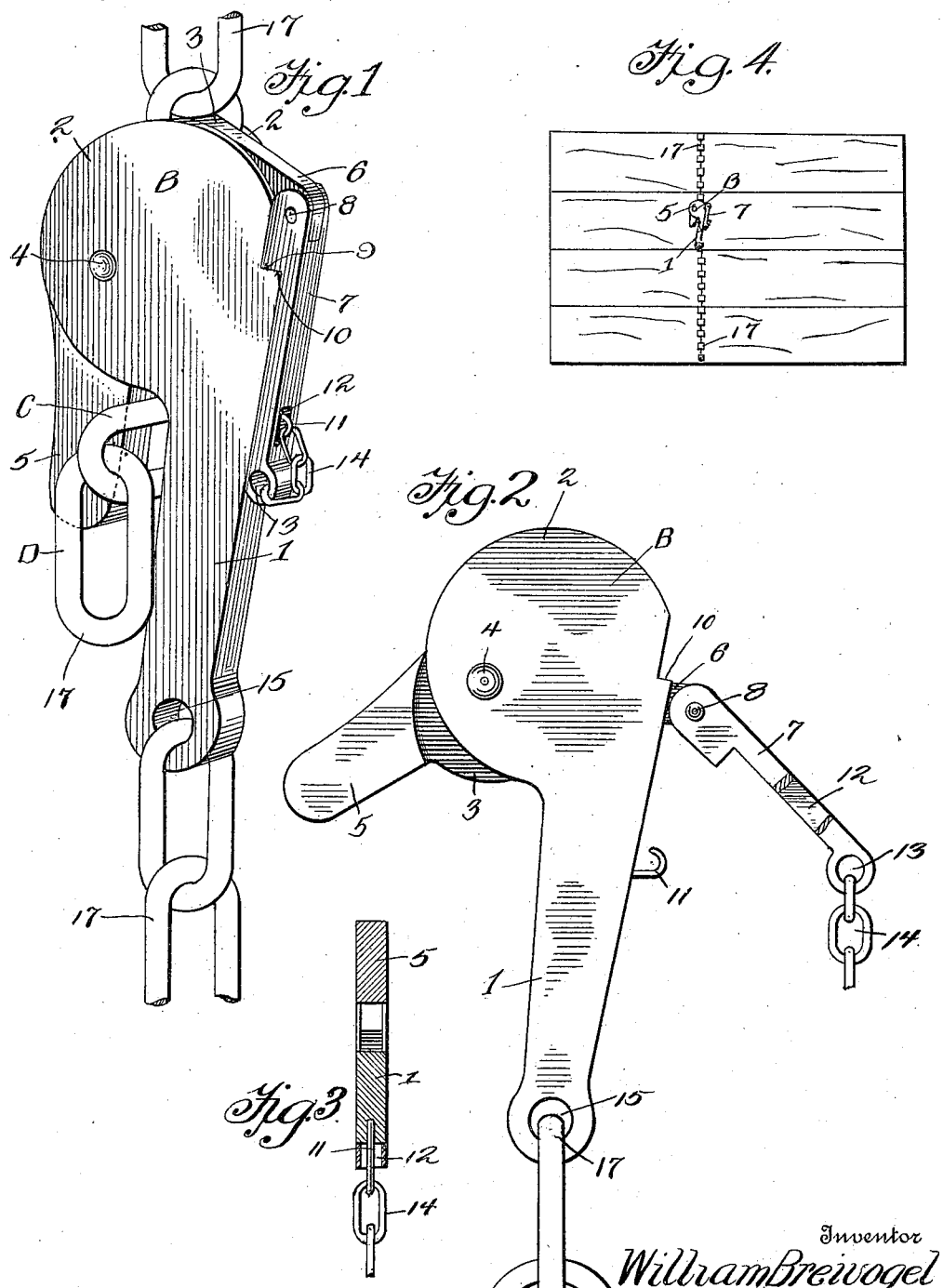

WILLIAM BREIVOGEL, OF GLEASON, WISCONSIN, ASSIGNOR TO HALL L. BROOKS, OF TOMAHAWK, WISCONSIN.

SAFETY GRAB-HOOK.

981,838.  Specification of Letters Patent.  Patented Jan. 17, 1911.

Application filed May 20, 1910. Serial No. 562,491.

*To all whom it may concern:*

Be it known that I, WILLIAM BREIVOGEL, a citizen of the United States of America, residing at Gleason, in the county of Lincoln and State of Wisconsin, have invented new and useful Improvements in Safety Grab-Hooks, of which the following is a specification.

This invention relates to safety grab hooks which are used in connection with chains for the purpose of tying or securing loads of logs and the like in position for transportation; and it has for its object to provide a device of simple and improved construction, whereby the ends of a tying chain may be securely connected together in such a manner as to enable them to be readily separated for the purpose of unloading when the tying chain is strained and under tension, as is usually the case, caused by the partial displacement of the load during transportation.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

In the drawing,—Figure 1 is a perspective view of the improved grab hook showing the two ends of the chain connected therewith. Fig. 2 is a side view, showing the hook thrown open for the disengagement of one end of the chain, a portion having been broken away to expose the subjacent construction. Fig. 3 is a vertical transverse sectional view, showing the device closed as in Fig. 1. Fig. 4 is a detail side view illustrating the operation of the device.

Corresponding parts in the several figures are denoted by like characters of reference.

The improved device includes a body comprising a bar or arm 1 having an enlarged head portion B which is split or bifurcated to form side members or cheeks 2, 2 between which an eccentrically disposed member or cam 3 is pivotally mounted upon a pin or bolt 4, said cam having an arm 5 which extends laterally adjacent to the upper edge of the arm 1. The cam 3 has a toe 6 with which a latch member 7 is pivotally connected by a pin 8, said latch member having an offset forming a shoulder 9 adapted to engage a corresponding shouldered notch 10 in the head member B.

Connected with and extending laterally from the arm 1 is a hook 11 adapted to engage a slot 12 in the latch member when the latter is folded adjacent to the edge of the arm 1, as will be seen in Fig. 1 of the drawings. The latch member has a terminal aperture 13 to support one end link of a chain 14, the other end link or an intermediate link of which is capable of engaging the hook 11 through the slot 12, thereby forming an obstruction which will prevent the latch member from accidentally swinging to an open position.

The arm 1 is provided with an aperture 15 for the accommodation of one end link of the tying chain 17.

In the operation of this device, the tying chain is passed around the load which is to be secured, and, after tightening it as far as possible, the free end of the chain is passed between the arms 1 and 5 of the device, after which said arms are brought together so as to accommodate one chain link flatwise therebetween, as is shown at C in Fig. 1, the next chain link D presenting an obstruction to the withdrawal of the free end of the chain. The latch member 7 is also brought to a position adjacent to the edge of the arm 1, and the shoulder 9 is placed in engagement with the notch 10. One link of the chain 14 is now placed in engagement with the hook 11 which projects slightly through the slot 12, thereby securing the latch member 7 against accidental displacement. To untie the chain, the end link of the chain 14 is disengaged from the hook, and the operator may now stand aside while he quickly jerks the chain 14 to disengage the latch member, thus causing the arm 5 to swing open under the strain of the tying chain which now becomes disengaged from beween the arms 1 and 5.

It is obvious that the chain 14 may be made of any desired length to enable the operator to stand out of the way of possible danger of injury from logs rolling off the load suddenly owing to having been displaced while in transit, or a separate trip rope or cord may be provided, if desired, such rope or cord being attached either to the chain 14 or directly to the aperture 13 of the latch member.

Having thus described the invention, what is claimed as new, is:—

1. In a device of the character described, a body member comprising an arm having at one end an enlargement forming a bifurcated head, said head being provided with a notch in the lower edge thereof, a cam member supported pivotally between the cheeks of the head member and having a laterally extending arm and a nose piece, a latch member connected pivotally with the nose piece and having an offset forming a shoulder for engagement with the notch in the head member, and means for securing the latch piece in locked relation with reference to the body and head member.

2. In a device of the character described, a body member having an enlarged bifurcated head, a cam supported pivotally between the cheeks of the head and having an arm and a nose piece, a latch member connected pivotally with the nose piece and having a shoulder adapted to engage a notch formed in the head, a tying chain engaging and securely connected with the body member, and means for securing the latch member in closed relation with reference to the body member.

3. In a device of the character described, a body member having a bifurcated head and a downwardly extending hook, the head being provided with a notch, a pivotally supported cam having a nose piece and a laterally extending arm, a latch member pivotally connected with the nose piece and having a longitudinal slot, said latch member being provided with a shoulder to engage the notch in the head portion, a chain connected with the latch member and having a terminal link adapted for engagement with the hook through the slot in said latch member, a tying chain having a link engaging the body member, and means for securely connecting said tying chain with the body member.

In testimony whereof I affix my signature in presence of two witnesses.

WILLIAM BREIVOGEL.

Witnesses:
C. L. BURT,
JAS. D. MCCUNN.